Sept. 3, 1929.  M. A. MARQUETTE  1,726,848
MANDREL
Filed June 16, 1924

INVENTOR.
Melvin A. Marquette
BY Edward C. Taylor
ATTORNEY.

Patented Sept. 3, 1929.

1,726,848

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

MANDREL.

Application filed June 16, 1924. Serial No. 720,157.

This invention relates to mandrels for making tubes, such as inner tubes for automobile tires, and has particular relation to such mandrels designed for the vulcanization of large diameter tires in approximately circular form. Its objects are the provision of a mandrel which in use will be economical, and which will have other advantages to be pointed out in more detail below.

Referring to the drawings.

Prior to my invention mandrels for the manufacture of inner tubes in curved form have been constructed out of metal tubing bent into an incomplete annulus or, in some cases, into helical form. After being cured on these mandrels, the tubes had their ends spliced together to form the well known annular inner tube of commerce. These mandrels served well enough for the smaller diameter tubes formerly used, and have been tried for the tubes of larger cross-sectional diameter now employed in the so-called balloon tires. As employed for such use, however, they are inefficient by reason of their large bulk, only a few of the mandrels being receivable within the usual vulcanizing heater.

Figure 1:
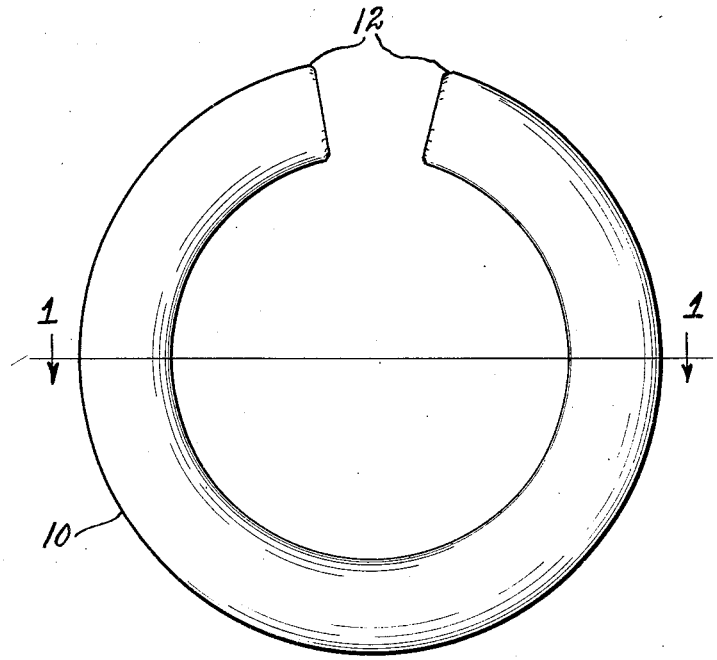
Fig. 1 is a plan of a mandrel constructed according to my invention.
Figure 2:
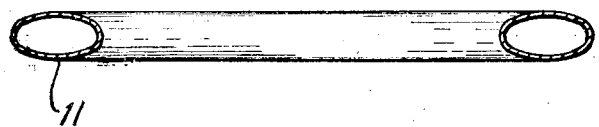
Fig. 2 is a section thereof on line 2—2 of Fig. 1.

According to my invention the mandrel 10, when viewed in plan as in Fig. 1, may be of any desired degree of curvature, and may have its ends slightly spaced, as shown, or overlapped, the mandrel in this case being in the general form of a helix. The helical form is in some cases advantageous as facilitating the operations of placing the tube on the mandrel and of removing it therefrom after vulcanization. In cross-section, however, my mandrel departs from prior practice, being oval or transversely flattened instead of round. The sides of the mandrel may be flat, but in case the ends or body of the rubber tube are to be taped to the mandrel the sides of the latter are preferably curved as shown at 11 in Fig. 2, although on a much larger radius from that of the inner and outer surfaces of the annulus, this affording a surface entirely curved around which tape may be effectively applied with a binding pressure at all points. Preferably the ends of the mandrel are rounded as at 12 to facilitate the placing of the tube thereon.

On account of their flattened or oval shape mandrels constructed according to my invention may be arranged side by side in a vulcanizing heater with a much smaller distance between their centers than would be the case were they made truly round as with previous mandrels. Consequently a larger number of tubes can be cured in a vulcanizing heater than would be otherwise possible. Furthermore, the flattened or oval shape of the mandrel gives to the tube a tendency to flatten which greatly facilitates the smooth deflation and folding of the tube prior to boxing.

Having thus described my invention, I claim:

A mandrel for use in the vulcanization in open heat of curved rubber inner tubes for pneumatic tire casings comprising a metallic tube in the form of an incomplete annulus and flattened in cross-section to the form of an ellipse of a width less than that of the tubes made thereon when placed in a tire casing, the major axis of the ellipse lying in the plane of the annulus.

MELVON A. MARQUETTE.